United States Patent Office 2,864,630
Patented Dec. 16, 1958

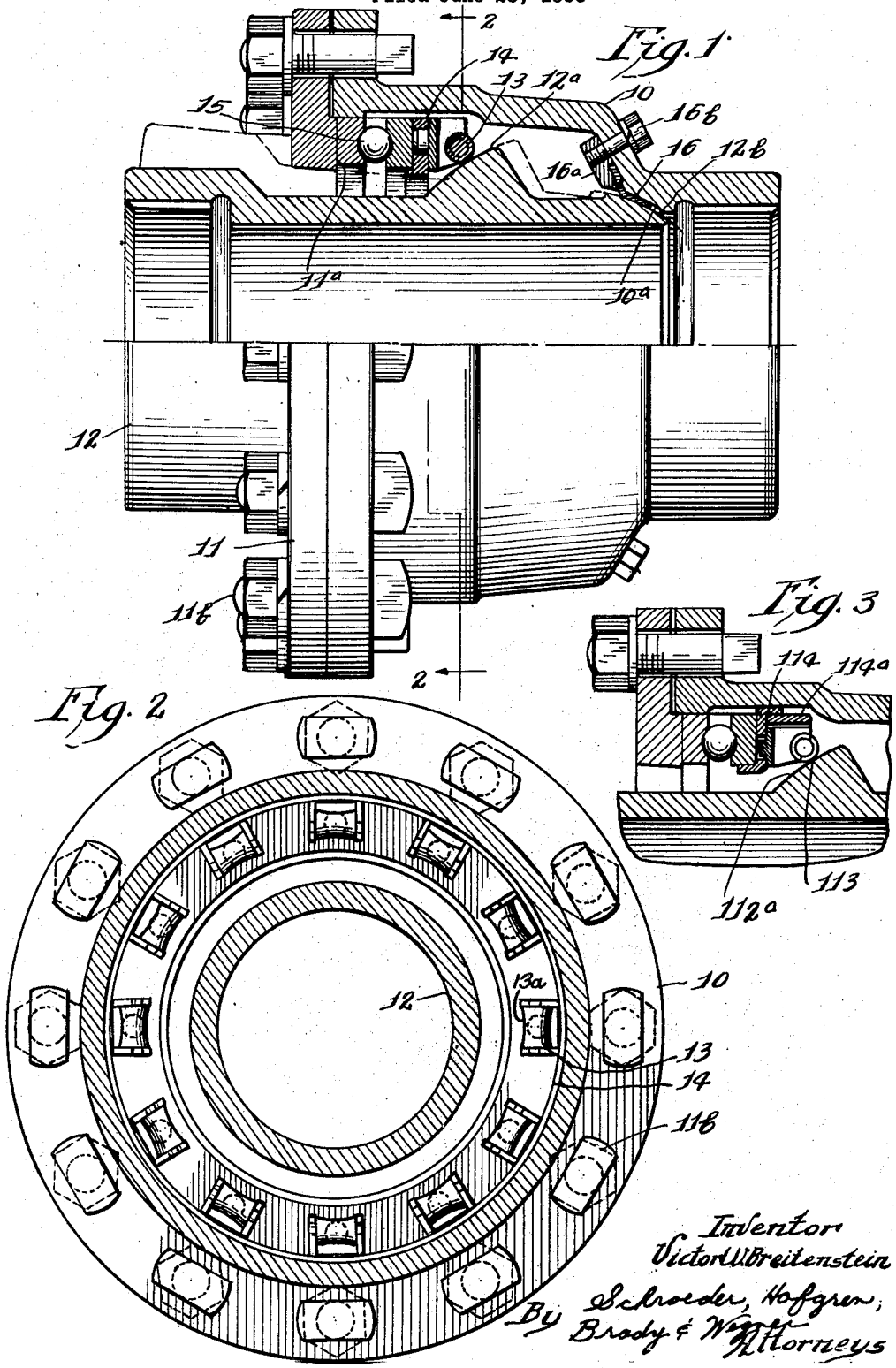

2,864,630

ANGULARLY MOVABLE BALL AND SOCKET JOINT HAVING BEARING MEANS PROVIDING SURFACE CONTACT WITH THE MOVABLE MEMBER

Victor W. Breitenstein, Arlington Heights, Ill., assignor to Francis N. Bard

Application June 28, 1956, Serial No. 594,511

7 Claims. (Cl. 285—261)

This invention relates to a fluid conductive joint, and in particular to a high pressure flexible joint.

The principal feature of the invention is the provision of a new and improved high pressure, wide-temperature-range joint having anti-friction bearing means.

A further feature is that the bearing means are arranged to permit individually or conjointly flexing and rotation of the movable joint member.

Another feature is that the bearing means includes roller bearings co-acting with a suitable segmentally spherical surface on one of the main joint members for accommodating flexing thereof.

A further feature is the provision of such a joint having an inner ball member, an outer casing member, and anti-friction bearing means for carrying the ball member in the casing member including a first bearing means for action during relative axial rotation of the ball and casing members and second bearing means for action during angular flexing movement between said members, said bearing means cooperatively acting to transmit large axial thrust forces between the ball member and the casing member.

Still another feature of the invention is the provision of a ball member having a first segmentally spherical surface for co-action with roller bearing means, and a second segmentally spherical surface having a smaller radius than said first surface and having a common center with said first surface for co-action with suitable means for effecting a wide-temperature-range seal between the ball member and the casing member.

Other features and advantages will be apparent from the following description taken in connection with the accompanying drawings wherein:

Figure 1 is a side elevational view of a joint embodying the invention, with one-half thereof shown in diametric section;

Figure 2 is a sectional view thereof taken approximately along the line 2—2 of Figure 1; and Figure 3 is a fragmentary sectional view of a joint similar to that of Figure 1 but having a modified form of bearing means support.

In the exemplary embodiment of the drawing, the joint is shown to comprise an outer member or casing 10 having secured to one end thereof a retaining flange 11. Extending into casing 10 is a tubular ball member 12 having a suitable segmentally spherical portion 12a adapted for cooperative action with complementary anti-friction bearing means 13. Bearing means 13 is carried by an annular support 14 which engages a second anti-friction bearing means 15 abutting casing 10 and retaining flange 11. The bearing means cooperatively provide a flexible, movable retention of ball member 12 in the casing and are adapted to transfer extremely high axially thrust forces between the ball and casing members.

To effect a fluid tight seal over a wide temperature range between the inner and outer joint members a suitable annular sealing ring 16 is arranged to extend between casing 10 and a reduced radius, segmentally spherical portion 12b of the ball member. Thus an effective seal is provided having reduced friction and allowing ready relative movement between the joint members.

Casing 10 is generally tubular and is formed of suitable rigid material capable of withstanding substantial fluid pressures. Retaining flange 11 may be formed of similar material and comprises an annular element having an internal diameter somewhat smaller than the diameter of the casing thereby forming a radial shoulder 11a at the outer end of casing 10. The internal diameter of retaining flange 11 is made sufficiently greater than the external diameter of the adjacent portion of ball member 12 to allow substantial angular movement of the ball member therein. Means for securing retaining flange 11 to casing 10 may comprise bolts 11b as shown.

Ball portion 12a faces longitudinally outwardly toward retaining flange 11 and is centered on the longitudinal axis of ball member 12. Bearing means 13 preferably comprises a plurality of concavely segmentally spherical rollers having a configuration complementary to the surface of ball portion 12a allowing free rolling movement thereof. Thus, each roller bearing means 13 is defined by a side wall 13a comprising a surface resulting from rotating an outwardly opening circular arc at a distance from and about the axis of the roller, the curvature of the arc being similar to the curvature of ball portion 12a. Thus, ball member 12 may be disposed readily in any angular position from the axial position shown in full lines in Figure 1 to an extreme position shown in dotted lines. Bearing means 13 is pivotally carried on support 14 so as to allow some movement of the rollers in a plane radial to the ball member axis for more precise engagement of the rollers with ball portion 12a. Bearing means 15 may be of any suitable anti-friction type and is shown herein as ball means extending between support 14 and shoulder 11a. As angular movement of ball member 12 is accommodated by the roller bearing means 13, bearing means 15 acts primarily to accommodate rotational movement of the ball member.

Segmentally spherical portion 12b is concentric with portion 12a and faces longitudinally oppositely from portion 12a. A complementary segmental spherical surface 10a is provided on casing 10 adjacent its inner end and has a radius slightly larger than the radius of ball portion 12b allowing the reception of sealing ring 16 therebetween. Means for securing ring 16 in place includes an annular member 16a which is arranged to be clamped against casing 10 by means of suitable bolts 16b. As the thrust forces normally developed in the joint by the fluid pressures therein act to move the ball member and casing member apart axially such forces are not transmitted through sealing ring 16 but are limited to transmission through the bearing means, thereby effectively minimizing wear of the sealing ring.

In Figure 3 is shown a modified form of annular support 114 having a Z-shaped cross-section and including a cylindrical equalizing ring 114a which provides a yieldable, radially outward support of the roller bearing means 113. In this modified form, the pivotal support of bearing means 113 may be substantially looser than that of means 13 in the embodiment of Figures 1 and 2, thereby, in conjunction with yieldable ring 114a, allowing accommodation of the rollers precisely to the ball surface 112a so that each roller carries its proper share of the load.

While I have shown and described certain embodiments of my invention, it is to be understood that it is capable of many modifications. Changes, therefore, in the construction and arrangement may be made

I claim:

1. A joint comprising: an outer member; an inner member; means for carrying the inner member movably in said outer member, having an anti-friction bearing means for action only during relative axial rotation of said members and an anti-friction bearing for action only during angular movement between said members, said anti-friction bearing having a surface portion engaging one of said members which portion is complementary to said one member; and means providing a fluid tight seal between said members.

2. A joint comprising: an outer member; a tubular inner member; means for rotatably carrying the inner member in said outer member and for transmitting large axial thrust forces from said inner member to said outer member, said means having anti-friction bearing means engaging one of said members allowing rotation of said inner member about its axis and roller bearing means engaging the other of said members allowing angular movement of the inner member, the surface portion of the roller bearing means engaging the other of said members being complementary thereto; and means providing a fluid tight seal between the members.

3. A joint comprising: a casing member; a ball member; means for carrying the ball member in said casing member including an annular support, roller bearing means carried on one portion of the support and arranged to engage the ball member and allow angular movement of the ball member, the surface portion of the roller bearing means engaging the ball member being complementary thereto, and anti-friction bearing means carried on another portion of the support and arranged to engage the casing and allow rotation of said ball member, said means acting to transmit thrust from the ball member to the casing; and means providing a fluid tight seal between the members.

4. A joint comprising: a casing member; a tubular member having a ball portion; means for rotatably carrying the tubular member in said casing member including an annular support, concavely segmentally spherical roller bearing means carried on the support and arranged to engage facially said ball portion, and anti-friction bearing means carried on the support longitudinally of said roller bearing means and arranged to engage the casing, said means being cooperatively arranged to transmit axial thrust from said ball portion to said roller bearing means, through said support, to said ball bearing means, and to said casing; and means providing a fluid tight seal between said members.

5. A joint comprising: a tubular casing having an end; an elongated tubular member extending through said end and having a ball portion in said casing, said ball portion having first and second segmentally spherical surfaces, each surface having a common center on the axis of the tubular member and said second surface having a substantially smaller radius than said first surface; sealing means engaging said casing and said second surface; means extending radially inwardly from said end to form a radial shoulder; and bearing means for carrying centrally in said casing said tubular member for rotational movement about its axis and pivotal movement about said center, including an annular support disposed between said first surface and said shoulder, anti-friction bearing means extending between said support and said shoulder for action during rotation of said tubular member, and roller bearing means complementary to and engaging said first surface and carried by said support for action during angular movement between said members, said bearing means acting to transmit large axial thrust forces from said tubular member to said casing.

6. A joint comprising: a tubular casing having an end and an internal segmentally spherical annular seat spaced from and facing toward said end; an elongated tubular member extending through said end and having a ball portion in said casing, said ball portion having first and second segmentally spherical, annular surfaces, each surface having a common center on the axis of the tubular member said first surface facing longitudinally toward said end and said second surface facing toward said seat and having a substantially smaller radius than said first surface; means providing a fluid tight seal between said seat and said second surface; means extending radially inwardly from said end to form a radial shoulder; and bearing means for carrying centrally in said casing said tubular member for rotational movement about its axis and angular movement about said center, including annular support means disposed between said first surface and said shoulder and generally concentrically freely around said tubular member, ball bearing means extending between said support means and shoulder, and means having a plurality of rollers complementary to and rollingly engaging said first surface and carried by said support means for pivotal movement in a plane normal to the axis of the support means, said bearing means acting to transmit large axial thrust forces from said tubular member to said casing.

7. The joint of claim 6 wherein said support means is provided with a yieldable equalizing ring for positioning said rollers in accurate engagement with said first surface.

References Cited in the file of this patent

UNITED STATES PATENTS 939,908     Greenlaw _____ Nov. 9, 1909

FOREIGN PATENTS 8,157     Netherlands _____ Feb. 15, 1923